(12) United States Patent
Yang et al.

(10) Patent No.: US 11,922,743 B2
(45) Date of Patent: Mar. 5, 2024

(54) LOGISTICS INFORMATION PROCESSING METHOD BASED ON ELECTRONIC LOCK, BLOCKCHAIN AND WAYBILL, AND APPARATUS AND DEVICE THEREOF

(71) Applicant: BEIJING JINGDONG ZHENSHI INFORMATION TECHNOLOGY CO., LTD., Beijing (CN)

(72) Inventors: Wenfeng Yang, Beijing (CN); Wenming Zhe, Beijing (CN); Binbin Xiu, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 231 days.

(21) Appl. No.: 17/540,843

(22) Filed: Dec. 2, 2021

(65) Prior Publication Data

US 2022/0092897 A1 Mar. 24, 2022

Related U.S. Application Data

(63) Continuation of application No. PCT/CN2020/081280, filed on Mar. 26, 2020.

(30) Foreign Application Priority Data

Jun. 25, 2019 (CN) .......................... 201910557227.9

(51) Int. Cl.
*G08B 21/00* (2006.01)
*G06F 16/27* (2019.01)
(Continued)

(52) U.S. Cl.
CPC ......... *G07C 9/00309* (2013.01); *G06F 16/27* (2019.01); *G06Q 10/0836* (2013.01);
(Continued)

(58) Field of Classification Search
CPC .. G07C 9/00309; G07C 9/00912; G07C 9/21; G07C 9/23; G07C 2009/00412;
(Continued)

(56) References Cited

U.S. PATENT DOCUMENTS

2004/0148295 A1* 7/2004 Stevens ............ G07B 17/00733
2012/0215714 A1* 8/2012 Loebertmann ....... G06Q 10/083
705/331
(Continued)

FOREIGN PATENT DOCUMENTS

CN 105201290 A 12/2015
CN 108416560 * 8/2018
(Continued)

OTHER PUBLICATIONS

International Search Report dated Jul. 1, 2020 for International Patent Application No. PCT/CN2020/081280.
(Continued)

*Primary Examiner* — Mark S Rushing

(57) ABSTRACT

Embodiments of the present disclosure provide a logistics information processing method and apparatus, and a device. The method includes: a blockchain node receives a locking request sent by a handheld terminal, and the locking request includes an identifier of an electronic lock on a logistics box and a waybill number of an item in the logistics box; the blockchain node acquires an unlocking key of the electronic lock corresponding to the waybill number according to the locking request, and the unlocking key is confirmed by a receiving terminal corresponding to the item; the blockchain node generates a locking instruction according to the unlocking key and the waybill number, and sends the locking instruction to the electronic lock, where the locking instruction is used to instruct the electronic lock to lock, and
(Continued)

store the unlocking key and the waybill number. Logistics security of the item is improved.

18 Claims, 14 Drawing Sheets

(51) Int. Cl.
    *G06Q 10/0836*     (2023.01)
    *G07C 9/00*     (2020.01)
    *G07C 9/21*     (2020.01)
    *G07C 9/23*     (2020.01)
    *H04L 9/08*     (2006.01)
    *H04L 9/00*     (2022.01)

(52) U.S. Cl.
    CPC ........... *G07C 9/00912* (2013.01); *G07C 9/21* (2020.01); *G07C 9/23* (2020.01); *H04L 9/0819* (2013.01); *G07C 2009/00412* (2013.01); *G07C 2009/0092* (2013.01); *H04L 9/50* (2022.05)

(58) Field of Classification Search
    CPC ........ G07C 2009/0092; G07C 9/00174; G07C 9/00896; G06F 16/27; G06Q 10/0836; G06Q 10/083; G06Q 10/0832; G06Q 10/0833; H04L 9/0819; H04L 9/50; H04L 9/3239
    USPC ........................................................ 340/5.73
    See application file for complete search history.

(56) References Cited

U.S. PATENT DOCUMENTS

| | | |
|---|---|---|
| 2016/0335595 A1 | 11/2016 | Levy et al. |
| 2017/0181559 A1* | 6/2017 | Lee ................... G06Q 10/0832 |
| 2018/0167394 A1* | 6/2018 | High ....................... H04L 63/10 |
| 2018/0177319 A1 | 6/2018 | Willis et al. |
| 2019/0037012 A1 | 1/2019 | Stocker |
| 2019/0043298 A1 | 2/2019 | Moudy |
| 2019/0147510 A1 | 5/2019 | Soeda |
| 2019/0147559 A1 | 5/2019 | Lee et al. |

FOREIGN PATENT DOCUMENTS

| | | | |
|---|---|---|---|
| CN | 108416560 A | | 8/2018 |
| CN | 109035510 A | | 12/2018 |
| CN | 109345182 A | | 2/2019 |
| CN | 109615292 | * | 4/2019 |
| CN | 109615292 A | | 4/2019 |
| CN | 109828847 A | | 5/2019 |
| CN | 110490505 A | | 11/2019 |
| DE | 20 2011 101 134 U1 | | 9/2011 |
| JP | 2006-336255 A | | 12/2006 |
| JP | 2019-91402 A | | 6/2019 |
| WO | 2019/108643 A1 | | 6/2019 |

OTHER PUBLICATIONS

The Extended European Search Report for European Patent Application No. 20831182.9, dated Dec. 5, 2022.
The Notice of Reasons for Refual for Japanese Patent Application No. 2021-570734, dated Jan. 30, 2023.

* cited by examiner

LOGISTICS INFORMATION PROCESSING METHOD BASED ON ELECTRONIC LOCK, BLOCKCHAIN AND WAYBILL, AND APPARATUS AND DEVICE THEREOF

CROSS-REFERENCE TO RELATED APPLICATIONS

The present application is a continuation of International Application No. PCT/CN2020/081280, filed on Mar. 26, 2020, which claims priority to Chinese Patent Application No. 201910557227.9, filed with the China National Intellectual Property Administration on Jun. 25, 2019 and entitled "LOGISTICS INFORMATION PROCESSING METHOD AND APPARATUS, AND DEVICE". The disclosures of the aforementioned applications are incorporated herein by reference in their entireties.

TECHNICAL FIELD

Embodiments of the present disclosure relate to the field of computer technologies, and in particular, to a logistics information processing method and apparatus, and a device.

BACKGROUND

Currently, with continuous development of electronic commerce, more and more items are transported by way of logistics, and meanwhile, users are more and more focused on security of logistics.

In the related art, when an item is transported in a logistics manner, the item is usually packaged by using a paper express box or a paper express bag, and paper logistics information is attached to the packaged item, where the logistics information includes a logistics provider, recipient information, a receiving address, a waybill number, etc., and transportation personnel can transport the item according to the logistics information.

SUMMARY

According to a first aspect, an embodiment of the present disclosure provides a logistics information processing method, including:
  receiving, by a blockchain node, a locking request sent by a handheld terminal, where the locking request is used to request locking of a logistics box, and the locking request includes an identifier of an electronic lock on the logistics box and a waybill number of an item in the logistics box;
  acquiring, by the blockchain node, an unlocking key of the electronic lock corresponding to the waybill number according to the locking request, where the unlocking key is confirmed by a receiving terminal corresponding to the item; and
  generating, by the blockchain node, a locking instruction according to the unlocking key and the waybill number, and sending the locking instruction to the electronic lock, where the locking instruction is used to instruct the electronic lock to lock, and store the unlocking key and the waybill number.

In a possible implementation, generating, by the blockchain node, the locking instruction according to the unlocking key and the waybill number includes:
  acquiring, by the blockchain node, an encryption key corresponding to the identifier of the electronic lock; and
  encrypting, by the blockchain node, locking indication information, the unlocking key and the waybill number according to the encryption key to obtain the locking instruction, where the locking indication information is used to instruct to lock the electronic lock.

In a possible implementation, encrypting, by the blockchain node, the locking indication information, the unlocking key and the waybill number to obtain the locking instruction according to the encryption key includes:
  computing, by the blockchain node, first check information according to the locking indication information, the unlocking key, and the waybill number; and
  encrypting, by the blockchain node, the locking indication information, the unlocking key, the waybill number and the first check information according to the encryption key to obtain the locking instruction.

In a possible implementation, acquiring, by the blockchain node, the unlocking key of the electronic lock corresponding to the waybill number according to the locking request includes:
  generating, by the blockchain node, the unlocking key according to the locking request; and
  sending, by the blockchain node, the waybill number and the unlocking key to the receiving terminal.

In a possible implementation, acquiring, by the blockchain node, the unlocking key of the electronic lock corresponding to the waybill number according to the locking request includes:
  acquiring, by the blockchain node, the unlocking key sent by the receiving terminal according to the locking request, where the unlocking key is input by a recipient through the receiving terminal.

In a possible implementation, after the blockchain node sends the locking instruction to the electronic lock, the method further includes:
  acquiring, by the blockchain node, packing information, where the packing information includes the identifier of the electronic lock, the waybill number, and identity information of a packer; and
  adding, by the blockchain node, the packing information to a blockchain.

In a possible implementation, the method further includes:
  receiving, by the blockchain node, an unlocking request sent by a receiving terminal, where the unlocking request includes a first key and a waybill number, and the first key is a key input by a user through the receiving terminal and used to unlock an electronic lock corresponding to the waybill number;
  generating, by the blockchain node, an unlocking instruction according to unlocking indication information and the first key; and
  sending, by the blockchain node, the unlocking instruction to the electronic lock corresponding to the waybill number according to the waybill number.

In a possible implementation, generating, by the blockchain node, the unlocking instruction according to the unlocking indication information and the first key includes:
  acquiring, by the blockchain node, an encryption key corresponding to the electronic lock; and
  encrypting, by the blockchain node, the unlocking indication information, the first key and the waybill number according to the encryption key to obtain the unlocking instruction, where the unlocking indication information is used to instruct to unlock the electronic lock.

In a possible implementation, encrypting, by the blockchain node, the unlocking indication information, the first key and the waybill number according to the encryption key to obtain the unlocking instruction includes:

computing, by the blockchain node, second check information according to the unlocking indication information, the first key, and the waybill number; and encrypting, by the blockchain node, the unlocking indication information, the first key, the waybill number and the second check information according to the encryption key to obtain the unlocking instruction.

In a possible implementation, after the blockchain node sends the unlocking instruction to the electronic lock, the method further includes:

receiving, by the blockchain node, unlocking success information sent by the electronic lock, where the unlocking success information includes the identifier of the electronic lock and the waybill number; and adding, by the blockchain node, the unlocking success information to a blockchain.

According to a second aspect, an embodiment of the present disclosure provides a logistics information processing method, including:

receiving, by an electronic lock, a locking instruction sent by a blockchain node, where the locking instruction includes locking indication information, an unlocking key and a waybill number;

executing, by the electronic lock, a locking operation according to the locking indication information; and storing, by the electronic lock, the unlocking key and the waybill number.

In a possible implementation, the locking instruction further includes first check information; executing, by the electronic lock, the locking operation according to the locking indication information includes:

generating, by the electronic lock, third check information according to the waybill number, the locking indication information and the unlocking key; and when the electronic lock determines that the first check information and the third check information are the same, executing, by the electronic lock, the locking operation according to the locking indication information.

In a possible implementation, the method further includes:

receiving, by the electronic lock, an unlocking instruction sent by the blockchain node, where the unlocking instruction includes unlocking indication information and a first key;

determining, by the electronic lock, whether the first key is the same as the unlocking key; and if yes, executing, by the electronic lock, an unlocking operation according to the unlocking indication information.

In a possible implementation, the unlocking instruction further includes the waybill number and second check information, and determining, by the electronic lock, whether the first key is the same as the unlocking key includes:

generating, by the electronic lock, fourth check information according to the unlocking indication information, the waybill number and the first key; and when the electronic lock determines that the fourth check information and the second check information are the same, determining, by the electronic lock, whether the first key and the unlocking key are the same.

In a possible implementation, after the electronic lock executes the unlocking operation according to the unlocking indication information, the method further includes:

sending, by the electronic lock, unlocking success information to the blockchain node, where the unlocking success information includes an identifier of the electronic lock and the waybill number.

In a possible implementation, after the electronic lock executes the unlocking operation according to the unlocking indication information, the method further includes:

deleting, by the electronic lock, the stored unlocking key and the waybill number.

According to a third aspect, an embodiment of the present disclosure provides a logistics information processing apparatus, which is applied to a blockchain node, and the apparatus includes a receiving module, a first acquiring module, a generating module and a sending module, where:

the receiving module is configured to receive a locking request sent by a handheld terminal, where the locking request is used to request locking of a logistics box, and the locking request includes an identifier of an electronic lock on the logistics box and a waybill number of an item in the logistics box;

the first acquiring module is configured to acquire an unlocking key of the electronic lock corresponding to the waybill number according to the locking request, where the unlocking key is confirmed by a receiving terminal corresponding to the item;

the generating module is configured to generate a locking instruction according to the unlocking key and the waybill number, where the locking instruction is used to instruct the electronic lock to lock, and store the unlocking key and the waybill number; and the sending module is configured to send the locking instruction to the electronic lock.

In a possible implementation, the generating module is specifically configured to:

acquire an encryption key corresponding to the identifier of the electronic lock; and encrypt locking indication information, the unlocking key and the waybill number according to the encryption key to obtain the locking instruction, where the locking indication information is used to instruct to lock the electronic lock.

In a possible implementation, the generating module is specifically configured to:

compute first check information according to the locking indication information, the unlocking key and the waybill number; and encrypt the locking indication information, the unlocking key, the waybill number, and the first check information according to the encryption key to obtain the locking instruction.

In a possible implementation, the first acquiring module is specifically configured to:

generate the unlocking key according to the locking request; and send the waybill number and the unlocking key to the receiving terminal.

In a possible implementation, the first acquiring module is specifically configured to:

acquire the unlocking key sent by the receiving terminal according to the locking request, where the unlocking key is input by a recipient through the receiving terminal.

In a possible implementation, the apparatus further includes a second acquiring module and an adding module, where:

the second acquiring module is configured to, after the sending module sends the locking instruction to the electronic lock, acquire packing information, where the packing information includes the identifier of the electronic lock, the waybill number, and identity information of a packer; and the adding module is configured to add the packing information to a blockchain.

In a possible implementation, the receiving module is further configured to receive an unlocking request sent by a receiving terminal, where the unlocking request includes a first key and a waybill number, and the first key is a key input by a user through the receiving terminal and used to unlock an electronic lock corresponding to the waybill number;

the generating module is further configured to generate an unlocking instruction according to the unlocking indication information and the first key; and the sending module is further configured to send the unlocking instruction to the electronic lock corresponding to the waybill number according to the waybill number.

In a possible implementation, the generating module is specifically configured to:

acquire an encryption key corresponding to the electronic lock; and encrypt the unlocking indication information, the first key and the waybill number according to the encryption key to obtain the unlocking instruction, where the unlocking indication information is used to instruct to unlock the electronic lock.

In a possible implementation, the generating module is specifically configured to:

compute second check information according to the unlocking indication information, the first key and the waybill number; and encrypt the unlocking indication information, the first key, the waybill number and the second check information according to the encryption key to obtain the unlocking instruction.

In a possible implementation, the receiving module is further configured to, after the sending module sends the unlocking instruction to the electronic lock, receive unlocking success information sent by the electronic lock, where the unlocking success information includes the identifier of the electronic lock and the waybill number; and the adding module is further configured to add the unlocking success information to a blockchain.

According to a fourth aspect, an embodiment of the present disclosure provides a logistics information processing apparatus, which is applied to an electronic lock, and the apparatus includes a receiving module, a locking module and a storing module, where:

the receiving module is configured to receive a locking instruction sent by a blockchain node, where the locking instruction includes locking indication information, an unlocking key and a waybill number;

the locking module is configured to execute a locking operation according to the locking indication information; and the storing module is configured to store the unlocking key and the waybill number.

In a possible implementation, the locking instruction further includes first check information; and the locking module is specifically configured to:

generate third check information according to the waybill number, the locking indication information and the unlocking key; and execute, by the electronic lock, the locking operation according to the locking indication information when it is determined that the first check information and the third check information are the same.

In a possible implementation, the apparatus further includes a determining module and an unlocking module, where:

the receiving module is further configured to receive an unlocking instruction sent by the blockchain node, where the unlocking instruction includes unlocking indication information and a first key;

the determining module is configured to determine whether the first key is the same as the unlocking key; and the unlocking module is configured to execute an unlocking operation according to the unlocking indication information when the determining module determines that the first key and the unlocking key are the same.

In a possible implementation, the unlocking instruction further includes the waybill number and second check information, and the determining module is specifically configured to:

generate fourth check information according to the unlocking indication information, the waybill number and the first key; and determine whether the first key and the unlocking key are the same when it is determined that the fourth check information and the second check information are the same.

In a possible implementation, the apparatus further includes a sending module, where the sending module is configured to, after the unlocking module executes the unlocking operation according to the unlocking indication information, send unlocking success information to the blockchain node, where the unlocking success information includes the identifier of the electronic lock and the waybill number.

In a possible implementation, the apparatus further includes a deleting module, where:

the deleting module is configured to delete the stored unlocking key and the waybill number after the unlocking module executes the unlocking operation according to the unlocking indication information.

According to a fifth aspect, an embodiment of the present disclosure provides a logistics information processing apparatus, including: at least one processor and a memory;

the memory stores computer execution instructions; and the at least one processor executes the computer execution instructions stored in the memory to cause the at least one processor to execute the logistics information processing method according to any one of the first aspect.

According to a sixth aspect, an embodiment of the present disclosure provides a logistics information processing apparatus, including: at least one processor and a memory;

the memory stores computer execution instructions; and the at least one processor executes the computer execution instructions stored in the memory to cause the at least one processor to execute the logistics information processing method according to any one of the second aspect.

According to a seventh aspect, an embodiment of the present disclosure provides a readable storage medium, including a program or an instruction, and when the program or the instruction is run on a computer, the logistics information processing method according to any one of the foregoing first aspect is executed.

According to an eighth aspect, an embodiment of the present disclosure provides a readable storage medium, including a program or an instruction, and when the program or the instruction is run on a computer, the logistics information processing method according to any one of the foregoing second aspect is executed.

According to a ninth aspect, an embodiment of the present application provides a computer program product, where the computer program product includes an instruction, and when the instruction is executed, a computer is caused to execute the logistics information processing method according to any one of the first aspect.

According to a tenth aspect, an embodiment of the present application provides a computer program product, where the computer program product includes an instruction, and when the instruction is executed, a computer is caused to execute the logistics information processing method according to any one of the foregoing second aspect.

BRIEF DESCRIPTION OF DRAWINGS

To illustrate technical solutions of embodiments of the present disclosure or the related art more clearly, the following briefly introduces accompanying drawings required for describing the embodiments or the related art. Obviously, the drawings described below are some embodiments of the present disclosure, for persons of ordinary skill in the art, without involving any creative effort, other drawings may also be obtained from these drawings.

DESCRIPTION OF EMBODIMENTS

In order to make the purpose, technical solutions and advantages of embodiments of the present disclosure clearer, the technical solutions in the embodiments of the present disclosure will be described clearly and completely below with reference to accompanying drawings in the embodiments of the present disclosure. Apparently, the described embodiments are a part of the embodiments of the present disclosure rather than all of the embodiments. Based on the embodiments of the present disclosure, all other embodiments obtained by persons of ordinary skill in the art without creative efforts belong to the protection scope of the present disclosure.

In the related art, when an item is transported in a logistics manner, the item is usually packaged by using a paper express box or a paper express bag, and paper logistics information is attached to the packaged item, where the logistics information includes a logistics provider, recipient information, a receiving address, a waybill number, etc., and transportation personnel can transport the item according to the logistics information. In a process of item logistics, the item may pass through a plurality of delivery links, and in any one of delivery links of the item, the item may be swapped, resulting in poor security of logistics for the item.

Figure 1:
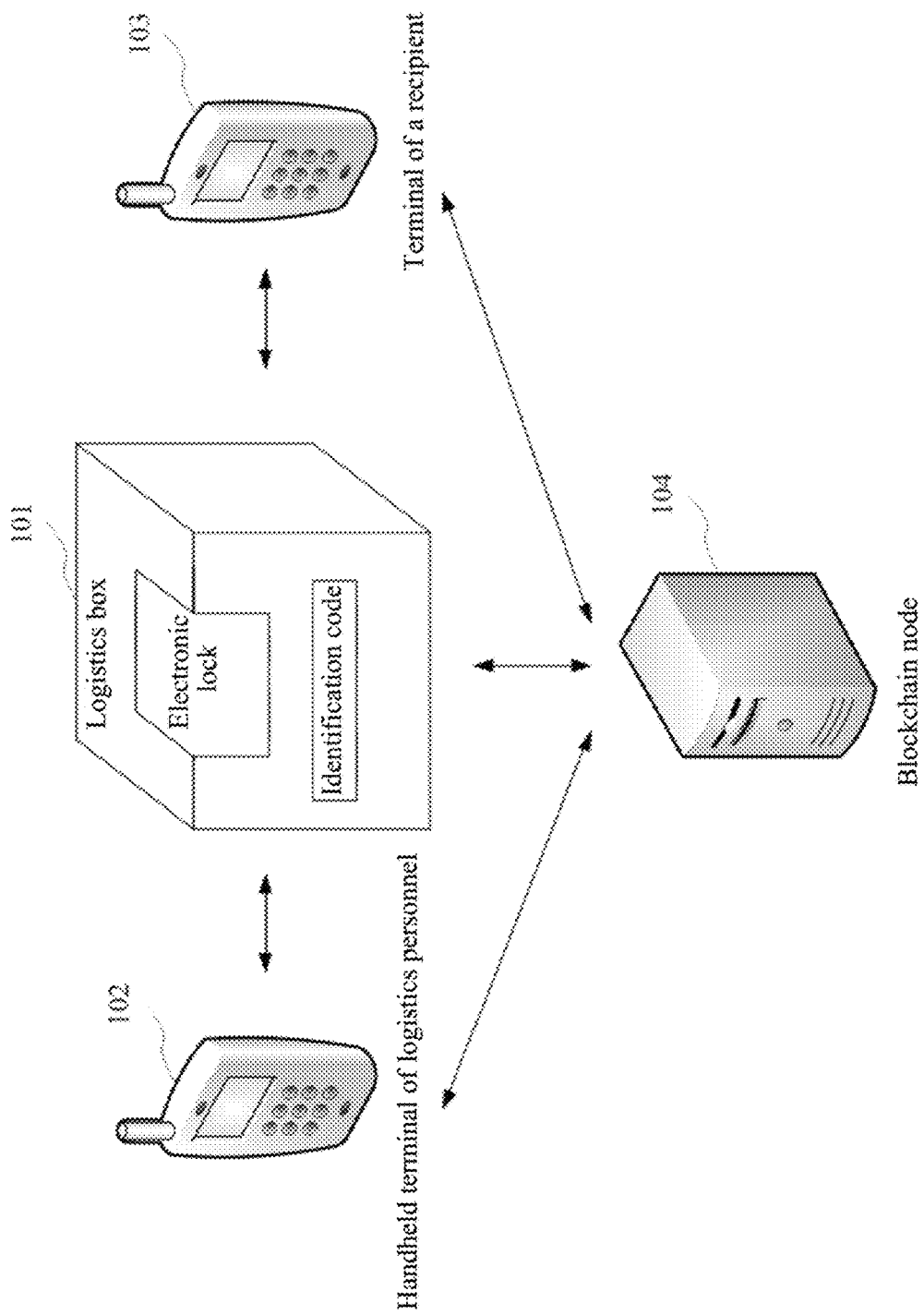
FIG. 1 is a system architecture diagram according to an embodiment of the present disclosure.

FIG. 1 is a system architecture diagram according to an embodiment of the present disclosure. Reference is made to FIG. 1, a logistics box 101, a handheld terminal 102 of logistics personnel, a terminal 103 of a recipient, and a blockchain node 104 are included. The logistics box 101 is configured to store an item to be delivered, and an electronic lock is provided on the logistics box 101. When the electronic lock is opened, the logistics box 101 can be opened, and when the electronic lock is closed, the logistics box 101 cannot be opened. The electronic lock has a unique identifier, and the logistics box and the electronic lock have a one-to-one correspondence; therefore, the identifier of the electronic lock can also identify a logistics box uniquely. An identification code may also be provided on the logistics box 101, and an electronic device may scan the identification code to acquire an identifier of an electronic lock, information about an item stored in the logistics box, etc.

Figure 2:
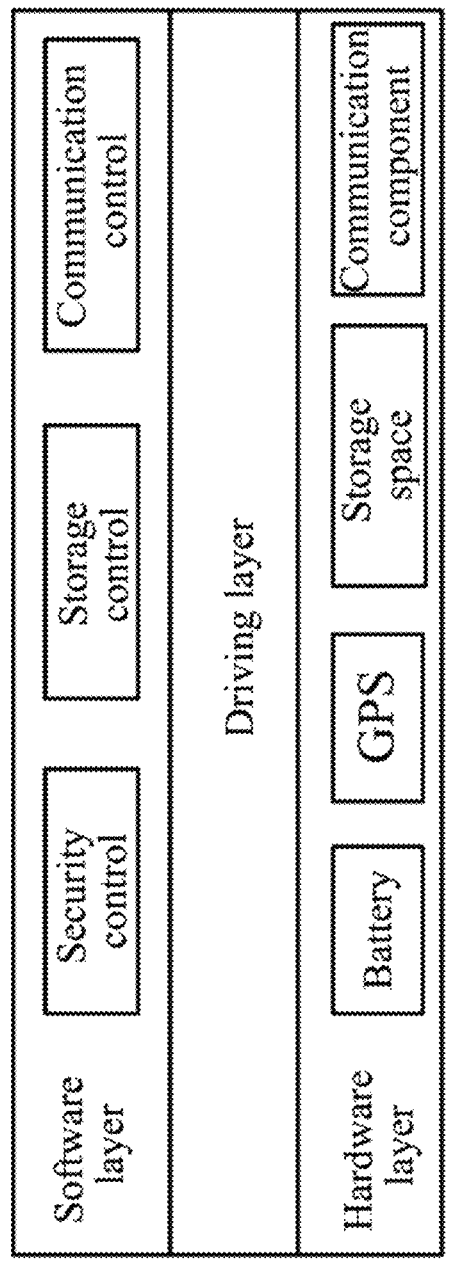
FIG. 2 is a schematic structural diagram of an electronic lock according to an embodiment of the present disclosure.

Hereinafter, a structure of the electronic lock will be described with reference to FIG. 2. FIG. 2 is a schematic structural diagram of an electronic lock according to an embodiment of the present disclosure. Reference is made to FIG. 2, the electronic lock may include a software layer, a driving layer and a hardware layer, where the hardware layer may include a battery, a GPS module, a storage space, a communication component, etc. The battery is used for supplying power to the electronic lock, the GPS module may acquire a position of the logistics box 101, the storage space may store data, and the communication component may be used for communicating with other devices (for example, a blockchain node, etc.). The software layer may include security control, storage control, communication control, and the like, and the driving layer is used to enable various software components and hardware components in the electronic lock to operate normally. Of course, other components may also be included in the electronic lock, which is not specifically limited in the embodiment of the present disclosure.

Figure 3:
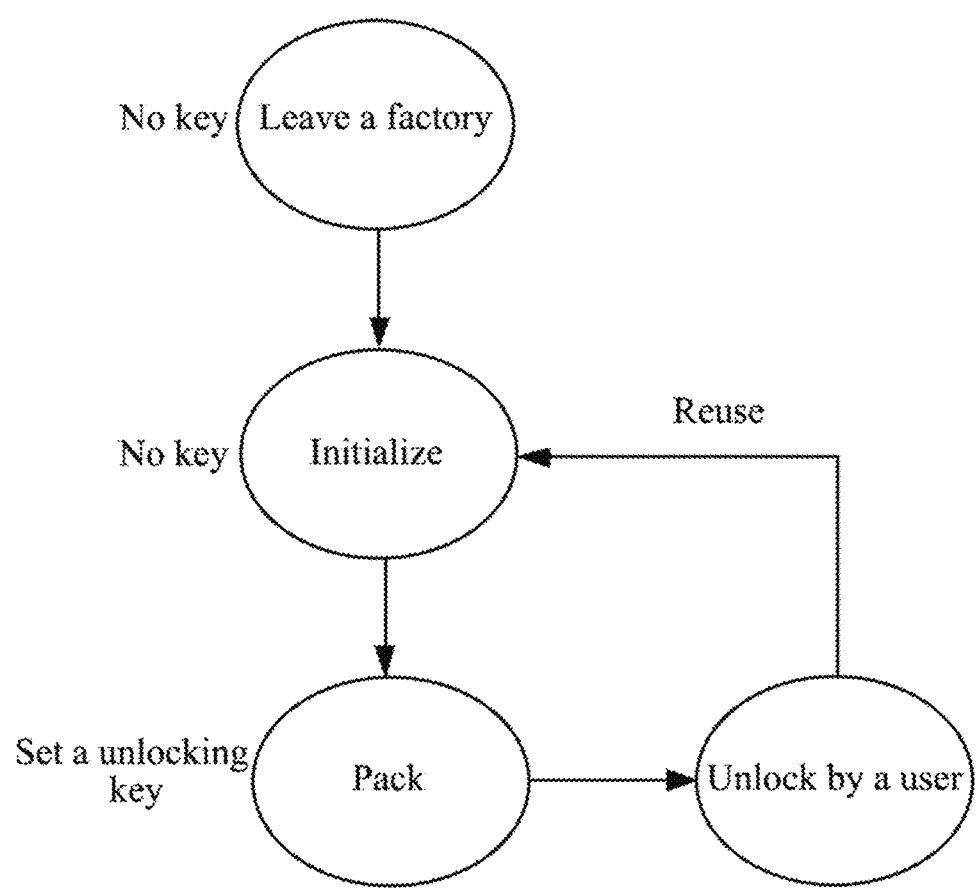
FIG. 3 is a schematic diagram of states of an electronic lock according to an embodiment of the present disclosure.

Hereinafter, states of the electronic lock will be described with reference to FIG. 3. FIG. 3 is a schematic diagram of states of an electronic lock according to an embodiment of the present disclosure. Reference is made to FIG. 3, when an electronic lock leaves a factory, an unlocking key is not set in the electronic lock. Before using a logistics box, the electronic lock of the logistics box is initialized first, and when the electronic lock is initialized, if an unlocking key is stored in the electronic lock, the unlocking key is cleared, thus the initialized electronic lock does not include the unlocking key. After storing an item in the logistics box (packing), an unlocking key of the electronic lock may be set, and the unlocking key is stored in the electronic lock. After a user unlocks the electronic lock, the logistics box is taken back to be reused.

In a practical application process, after an item is stored in a logistics box, logistics personnel may request a blockchain node to control an electronic lock to lock through a handheld terminal. The blockchain node may control the electronic lock to perform locking, and the blockchain node may also acquire an unlocking key of the electronic lock, and send the unlocking key to the electronic lock, so that a recipient and the electronic lock know the unlocking key, where the logistics box may be reused, and when the logistics box is used each time, the unlocking key of the electronic lock on the logistics box may be different. When the logistics box reaches the recipient, the recipient may unlock the electronic lock through the unlocking key. In the above process, only the recipient and the electronic lock can acquire the unlocking key, so that only the recipient can open the electronic lock on the logistics box, thereby improving security of logistics for the item.

Hereinafter, the technical solutions of the present application will be described in detail with reference to specific embodiments. It should be noted that, several specific embodiments below may be combined with each other, and the same or similar contents will not be described repeatedly in different embodiments.

Figure 4:
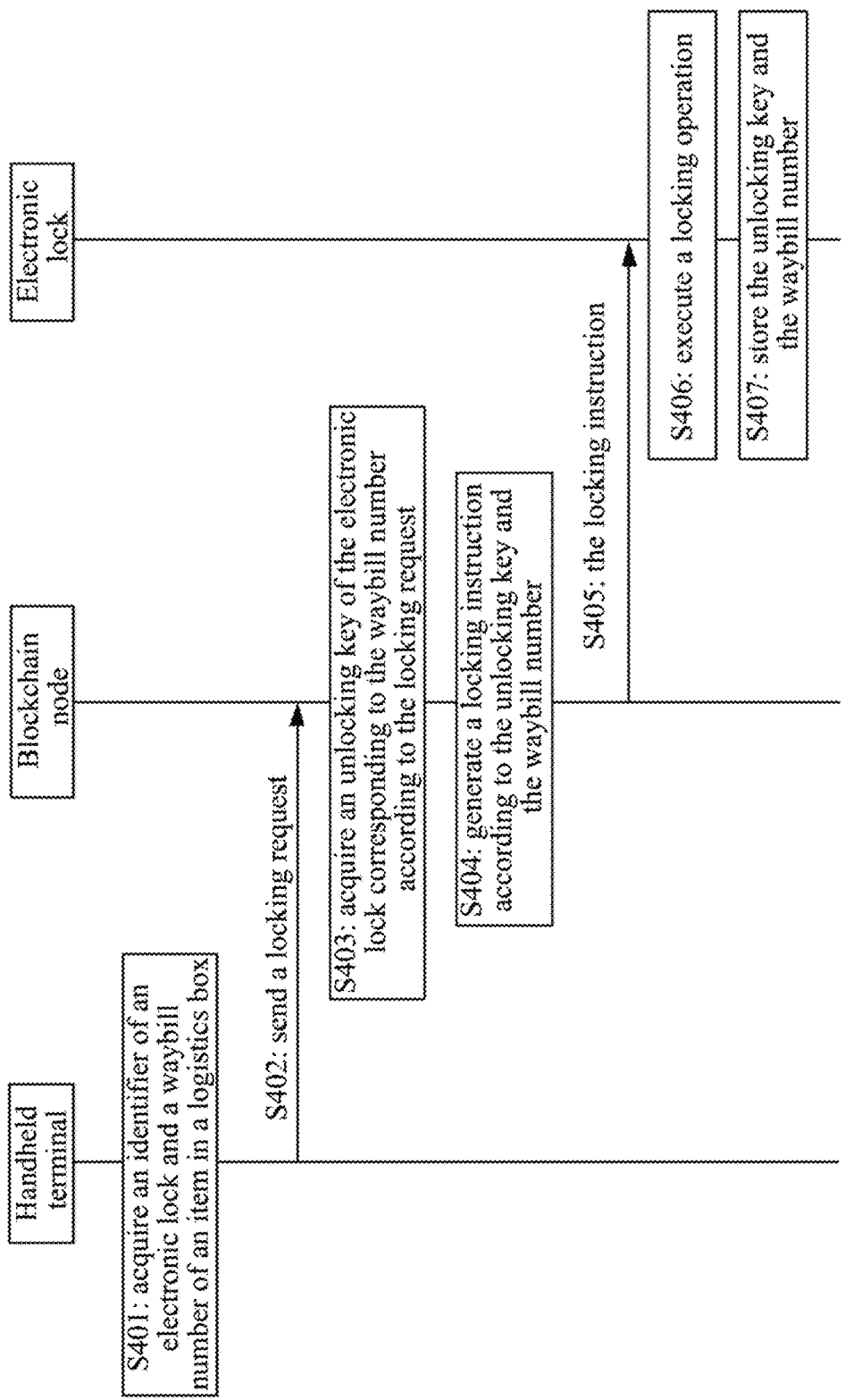
FIG. 4 is a schematic flowchart of a logistics information processing method according to an embodiment of the present disclosure.

FIG. 4 is a schematic flowchart of a logistics information processing method according to an embodiment of the present disclosure. Reference is made to FIG. 4, and the method may include:

S401: a handheld terminal acquires an identifier of an electronic lock and a waybill number of an item in a logistics box.

Before S401, a packer has stored the item in the logistics box, and the item has been assigned the waybill number, and the waybill number may be assigned by a logistics platform. The waybill number may indicate a unique item in logistics.

The handheld terminal may be a handheld device of the packer, and the handheld terminal may be provided with a camera apparatus, and the packer may scan an identification code on the logistics box by using the camera apparatus on the handheld terminal, so as to acquire the waybill number.

Optionally, the handheld terminal may acquire the waybill number through the following feasible implementations.

A possible Implementation

Before S401, a corresponding relationship between a waybill number and an identifier of the electronic lock is set, and the corresponding relationship is stored in a preset device, for example, the preset device may be a logistics platform. After the packer scans the waybill number through the handheld terminal, the handheld terminal may acquire the waybill number, and query a waybill number corresponding to the identifier of the electronic lock in the preset device through the waybill number.

Another Possible Implementation

The item is pasted with an identification code corresponding to the waybill number, and the packer may scan the identification code corresponding to the waybill number by the handheld terminal to acquire the waybill number of the item.

S402: the handheld terminal sends a locking request to a blockchain node.

The locking request is used to request locking of the logistics box, and the locking request includes the identifier of the electronic lock on the logistics box and the waybill number of the item in the logistics box.

Optionally, after acquiring the identifier of the electronic lock and the waybill number, the handheld terminal may actively send the locking request to the blockchain node. The handheld terminal may also send the locking request to the blockchain node after receiving a preset instruction which is input by the packer.

Optionally, the locking request may further include identity information and authentication information of the packer. For example, the identity information may be a certificate of the packer, an identification number of the packer, a work number, etc. The authentication information may be signature information of the packer.

S403: the blockchain node acquires an unlocking key of the electronic lock corresponding to the waybill number according to the locking request.

The unlocking key is confirmed by a recipient of the item, that is, the recipient of the item knows the unlocking key.

Optionally, when the locking request includes the identity information and the authentication information of the packer, the blockchain node may first verify the identity information and the authentication information of the packer, and after the verification is passed, S403 is executed, thus the security of logistics for the item can be improved.

Optionally, after the blockchain node acquires the locking request, it may further determine whether information in the locking request satisfies a preset format requirement first, and if yes, S403 is executed.

Optionally, the blockchain node may acquire the unlocking key of the electronic lock through at least the following two possible implementations.

A possible Implementation

The blockchain node generates the unlocking key according to the locking request, and sends the waybill number and the unlocking key to a receiving terminal (a terminal device corresponding to the recipient).

The receiving terminal may be a device used by the recipient to purchase the item, or may be a terminal device corresponding to a preset communication number, and the communication number may be a mobile phone number, a registered account of an application (for example, a shopping application), etc.

For example, the blockchain node may randomly generate the unlocking key, that is, the key may be a random number.

In this feasible implementation, it does not need the recipient to perform an operation to acquire the unlocking key, which renders better user experience.

Another Possible Implementation:

The blockchain node acquires the unlocking key sent by the receiving terminal according to the locking request, where the unlocking key is input by the recipient on the receiving terminal.

Optionally, after a user purchases an item, the user inputs an unlocking key by the receiving terminal, and the receiving terminal sends the unlocking key to the blockchain node.

In this feasible implementation, the unlocking key is set by the user, thus it is convenient to memorize the unlocking key, which renders better user experience.

S404: the blockchain node generates a locking instruction according to the unlocking key and the waybill number.

Optionally, the locking instruction includes the unlocking key, the waybill number and locking indication information, and the locking indication information is used to instruct to lock the electronic lock.

S405: the blockchain node sends the locking instruction to the electronic lock.

Optionally, the blockchain node may determine a communication module tunnel of the electronic lock according to the identifier of the electronic lock, and send the locking instruction to the electronic lock through the tunnel.

Optionally, after the blockchain node sends the locking instruction to the electronic lock, the blockchain node acquires packing information, and adds the packing information to a blockchain. The packing information includes the identifier of the electronic lock, the waybill number, and the identity information of the packer. In this way, items can be tracked according to information in the blockchain, thereby improving the security of logistics for the items.

Optionally, when the packing information is added to the blockchain, one or more of the following information may be added to the blockchain: the packing information, a hash value of the packing information, and signature information obtained by signing the hash value of the packing information.

Optionally, when the number of blocks in the blockchain reaches a preset threshold, information in the blocks may be packaged, a hash value of the information in the packaged blocks may be calculated, the hash value is signed, and the hash value and the signature are written into the blockchain.

Optionally, the packing information may further include an order number, packing time, a packing location, etc.

S406: the electronic lock executes a locking operation according to the locking indication information.

S407: the electronic lock stores the unlocking key and the waybill number.

Optionally, the storage space of the electronic lock includes a first storage area. The identification code on the logistics box is used to indicate contents in the first storage area, that is, when the user scans the identification code through the receiving terminal, the contents in the first storage area may be acquired.

Optionally, before S407, the first storage area stores the identifier of the electronic lock, that is, before S407, when the user scans the identification code through the receiving terminal, the identifier of the electronic lock may be acquired. In S407, the waybill number of the electronic lock may be stored in the first storage area, and correspondingly, when the user scans the identification code through the receiving terminal, the user may acquire the identifier of the electronic lock and the waybill number.

According to the logistics information processing method provided by the embodiment of the present disclosure, after the item is stored in the logistics box, the logistics personnel may request the blockchain node to control the electronic lock to lock through the handheld terminal. The blockchain node may control the electronic lock to lock, and the blockchain node may also acquire the unlocking key of the electronic lock, and send the unlocking key to the electronic lock, so that only the recipient and the electronic lock know the unlocking key. When the logistics box reaches the recipient, the recipient may unlock the electronic lock through the unlocking key. In the above process, only the recipient and the electronic lock can acquire the unlocking key, so that only the recipient can open the electronic lock on the logistics box, thereby improving the security of logistics for the item.

On the basis of the embodiment shown in FIG. 4, in order to further improve the security of logistics for the item, information which is exchanged between the blockchain node and the electronic lock may be encrypted and verified. For details, reference is made to the embodiment shown in FIG. 5.

Figure 5:
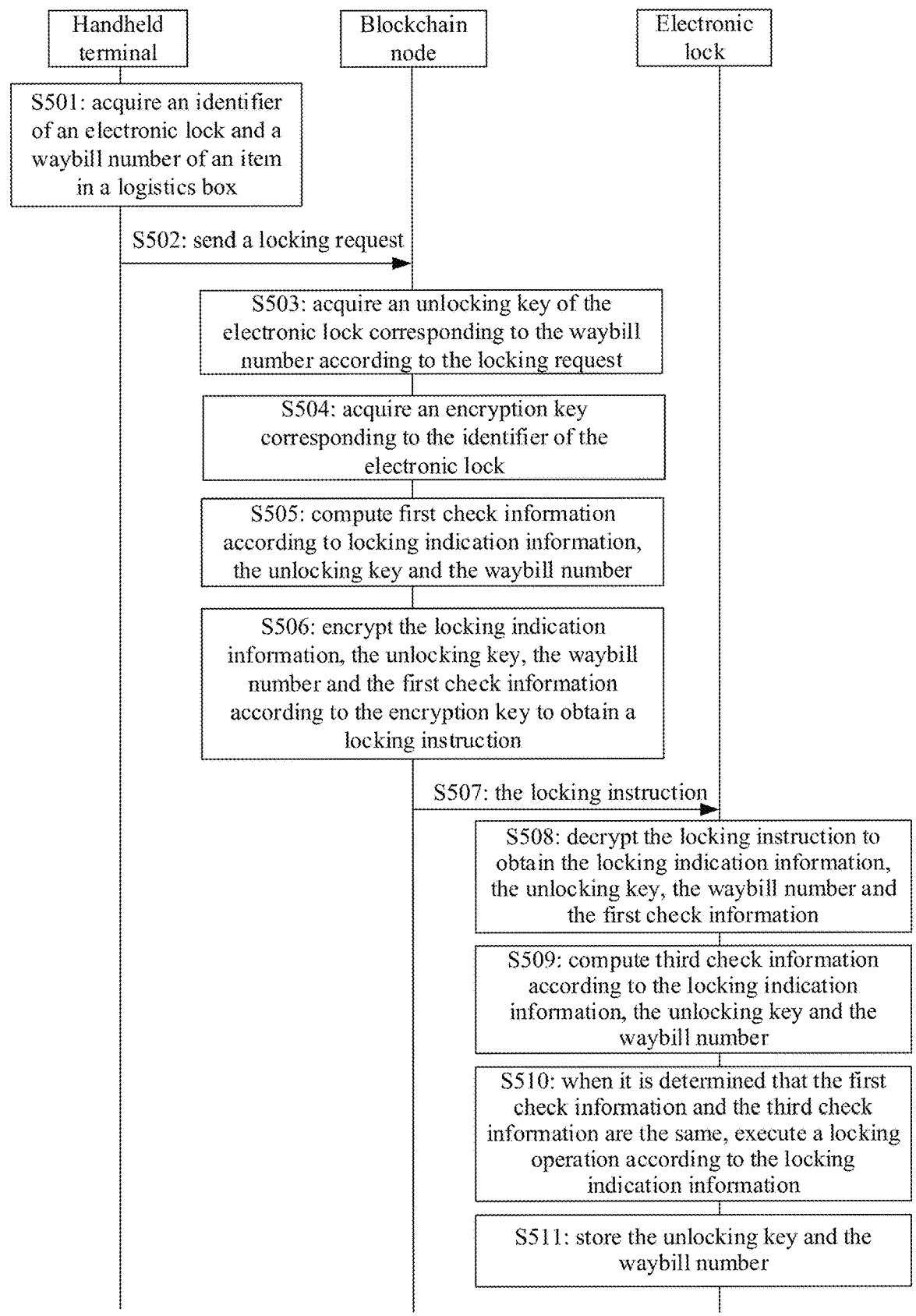
FIG. 5 is a schematic flowchart of another logistics information processing method according to an embodiment of the present disclosure.

FIG. 5 is a schematic flowchart of another logistics information processing method according to an embodiment of the present disclosure. Reference is made to FIG. 5, and the method may include:

S501: a handheld terminal acquires an identifier of an electronic lock and a waybill number of an item in a logistics box.

S502: the handheld terminal sends a locking request to a blockchain node.

The locking request is used to request locking of the logistics box, and the locking request includes the identifier of the electronic lock on the logistics box and the waybill number of the item in the logistics box.

S503: the blockchain node acquires an unlocking key of the electronic lock corresponding to the waybill number according to the locking request.

It should be noted that, for execution processes of S501 to S503, reference may be made to execution processes of S401 to S403, and details are not described herein again.

S504: the blockchain node acquires an encryption key corresponding to the identifier of the electronic lock.

Optionally, an identifier of an electronic lock and an encryption key have a preset corresponding relationship, and accordingly, the encryption key may be acquired according to the identifier of the electronic lock and the corresponding relationship.

S505: the blockchain node computes first check information according to locking indication information, the unlocking key and the waybill number.

For example, the blockchain node may compute the first check information by using the cyclic redundancy check (CRC) 16 algorithm, or may compute the first check information by using the CRC32 algorithm. Of course, the first check information may also be computed by using other check algorithms, which is not specifically limited in the embodiment of the present disclosure.

S506: the blockchain node encrypts the locking indication information, the unlocking key, the waybill number and the first check information according to the encryption key to obtain a locking instruction.

S507: the blockchain node sends the locking instruction to the electronic lock.

It should be noted that, for the execution process of S507, reference may be made to the execution process of S405, and details are not described herein again.

S508: the electronic lock decrypts the locking instruction to obtain the locking indication information, the unlocking key, the waybill number and the first check information.

Optionally, the electronic lock stores a decryption key corresponding to the encryption key locally, and the electronic lock may decrypt the locking instruction by using the decryption key to obtain the locking indication information, the unlocking key, the waybill number and the first check information.

S509: the electronic lock computes third check information according to the locking indication information, the unlocking key and the waybill number.

For example, the electronic lock may compute the third check information by using the CRC16 algorithm, or may compute the third check information by using the CRC32 algorithm. Of course, the third check information may also be computed by using other check algorithms, which is not specifically limited in the embodiment of the present disclosure.

S510: when determining that the first check information and the third check information are the same, the electronic lock executes a locking operation according to the locking indication information.

Optionally, after the electronic lock is locked successfully, the electronic lock may send a locking success response message to the blockchain node.

It should be noted that, when the electronic lock determines that the first check information and the third check information are different, the electronic lock does not execute the locking operation, and the electronic device may send a locking failure response message to the blockchain node.

S511: the electronic lock stores the unlocking key and the waybill number.

It should be noted that, for the execution process of S511, reference may be made to the execution process of S407, and details are not described herein again.

In the embodiment shown in FIG. 5, after the item is stored in the logistics box, the logistics personnel may request the blockchain node to control the electronic lock to lock through the handheld terminal. The blockchain node may control the electronic lock to lock, and the blockchain node may also acquire the unlocking key of the electronic lock, and send the unlocking key to the electronic lock, so that only the recipient and the electronic lock know the unlocking key. When the logistics box reaches the recipient, the recipient may unlock the electronic lock through the unlocking key. In the above process, only the recipient and the electronic lock can acquire the unlocking key, so that only the recipient can open the electronic lock on the logistics box, thereby improving the security of logistics for the item. Further, when the blockchain node sends the locking instruction to the electronic lock, encryption processing is performed on the locking instruction, which avoids leakage of the locking instruction during a transmission, and the electronic lock can also check information in the received locking instruction by means of check information, and execute the locking operation only after the check is passed, thereby further improving the security of logistics for the item.

Hereinafter, an opening process of the electronic lock after the recipient receives the logistics box will be described with reference to the embodiments shown in FIG. 6 to FIG. 7.

Figure 6:
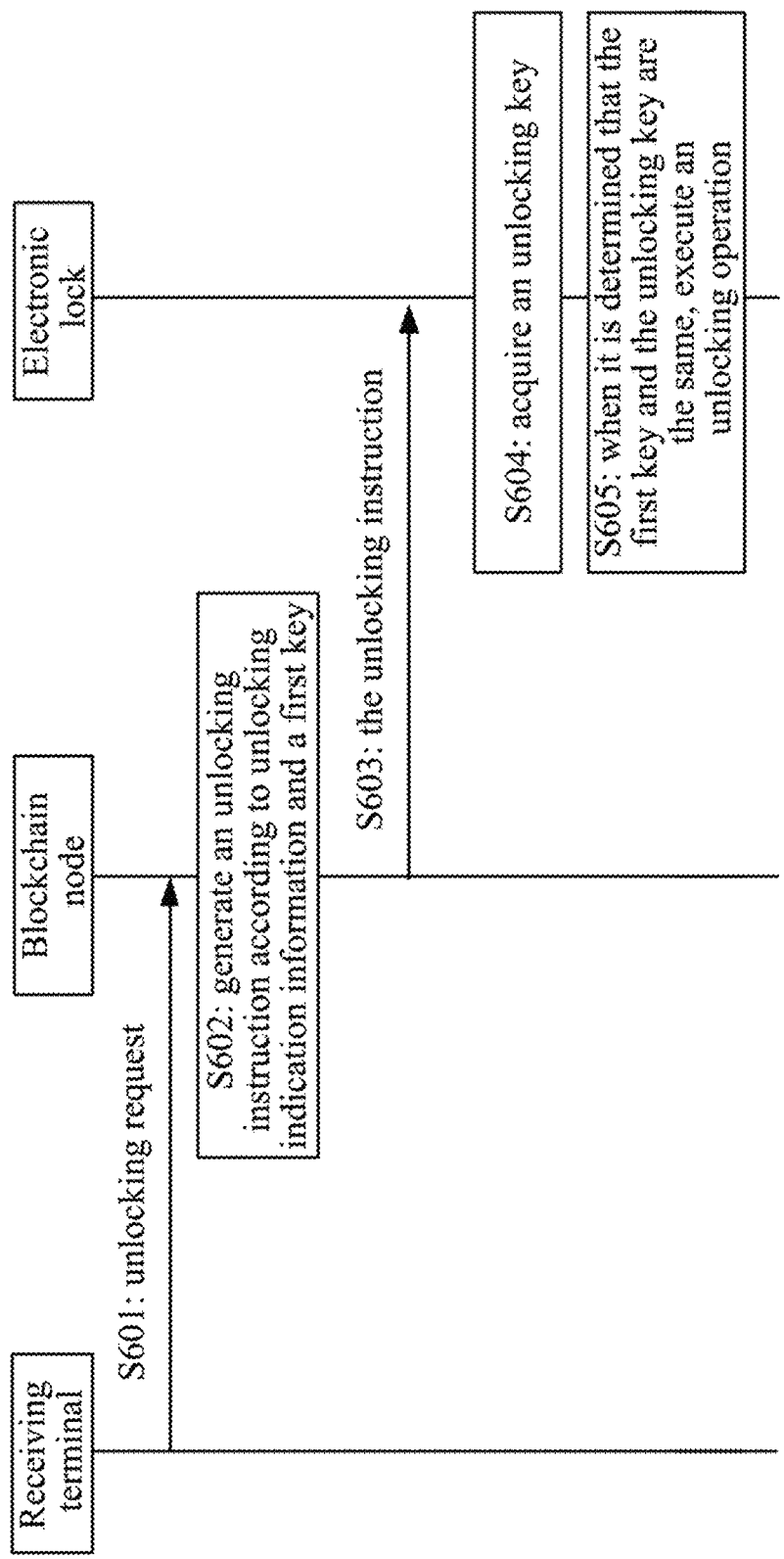
FIG. 6 is a schematic flowchart of still another logistics information processing method according to an embodiment of the present disclosure.

FIG. 6 is a schematic flowchart of still another logistics information processing method according to an embodiment of the present disclosure. Reference is made to FIG. 6, and the method may include:

S601: a receiving terminal sends an unlocking request to a blockchain node.

The unlocking request includes a waybill number and a first key, where the first key is a key input by a user through the receiving terminal and used for unlocking an electronic lock.

Optionally, after a recipient receives a logistics box, the recipient may scan an identification code on the logistics box through the receiving terminal to acquire the waybill number. The recipient may input the first key corresponding to the waybill number through the receiving terminal. The user may input a preset instruction through the receiving terminal, to cause the receiving terminal to send the unlocking request to the blockchain node. Or, after acquiring the waybill number and the first key, the receiving terminal may actively send the unlocking request to the blockchain node.

Optionally, the unlocking request may further include an identifier of the electronic lock.

During a practical application process, the logistics box needs to be distributed to a deliverer before the logistics box reaches the recipient. For example, the deliverer may scan the identification code on the logistics box through his handheld terminal, thus the logistics box is distributed to the deliverer. After the deliverer scans the identification code on the logistics box, an application in the handheld terminal may invoke a client write access of a blockchain, so as to send delivery information to the blockchain node, and the delivery information may include identity information of the deliverer, the waybill number and the identifier of the electronic lock. Of course, the delivery information may further include scanning time, a scanning location, an order number, etc.

S602: the blockchain node generates an unlocking instruction according to unlocking indication information and the first key.

The unlock indication information is used to instruct to unlock the electronic lock.

S603: The blockchain node sends the unlocking instruction to an electronic lock corresponding to the waybill number.

Optionally, the blockchain node may first determine a corresponding electronic lock according to the waybill number, and then send the unlocking instruction to the electronic lock.

Optionally, after acquiring the unlocking instruction, the blockchain node may determine an identifier of the electronic lock corresponding to the unlocking instruction (for example, the waybill number may be acquired in the unlocking instruction, and the identifier of the electronic lock corresponding to the waybill number is acquired), and determine a communication module tunnel of the electronic lock according to the identifier of the electronic lock, and send the unlocking instruction to the electronic lock through the tunnel.

S604: the electronic lock acquires an unlocking key.

Optionally, the electronic lock acquires the unlocking key in the storage space thereof.

S605: when the electronic lock determines that the first key and the unlocking key are the same, the electronic lock executes an unlocking operation according to unlocking indication information.

Optionally, after the electronic lock executes the unlocking operation, the electronic lock may send an unlocking success response message to the blockchain node.

Optionally, when the electronic lock determines that the first key and the unlocking key are different, the electronic lock does not execute the unlocking operation, and sends an unlocking failure response message to the blockchain node.

In the embodiment shown in FIG. 6, since only the recipient and the electronic lock can acquire the unlocking key, only the recipient can open the electronic lock on the logistics box, thereby improving the security of logistics for items.

On the basis of the embodiment shown in FIG. 6, in order to further improve the security of logistics for the item, information which is exchanged between the blockchain node and the electronic lock can be encrypted and verified. For details, reference may be made to the embodiment shown in FIG. 7.

Figure 7:
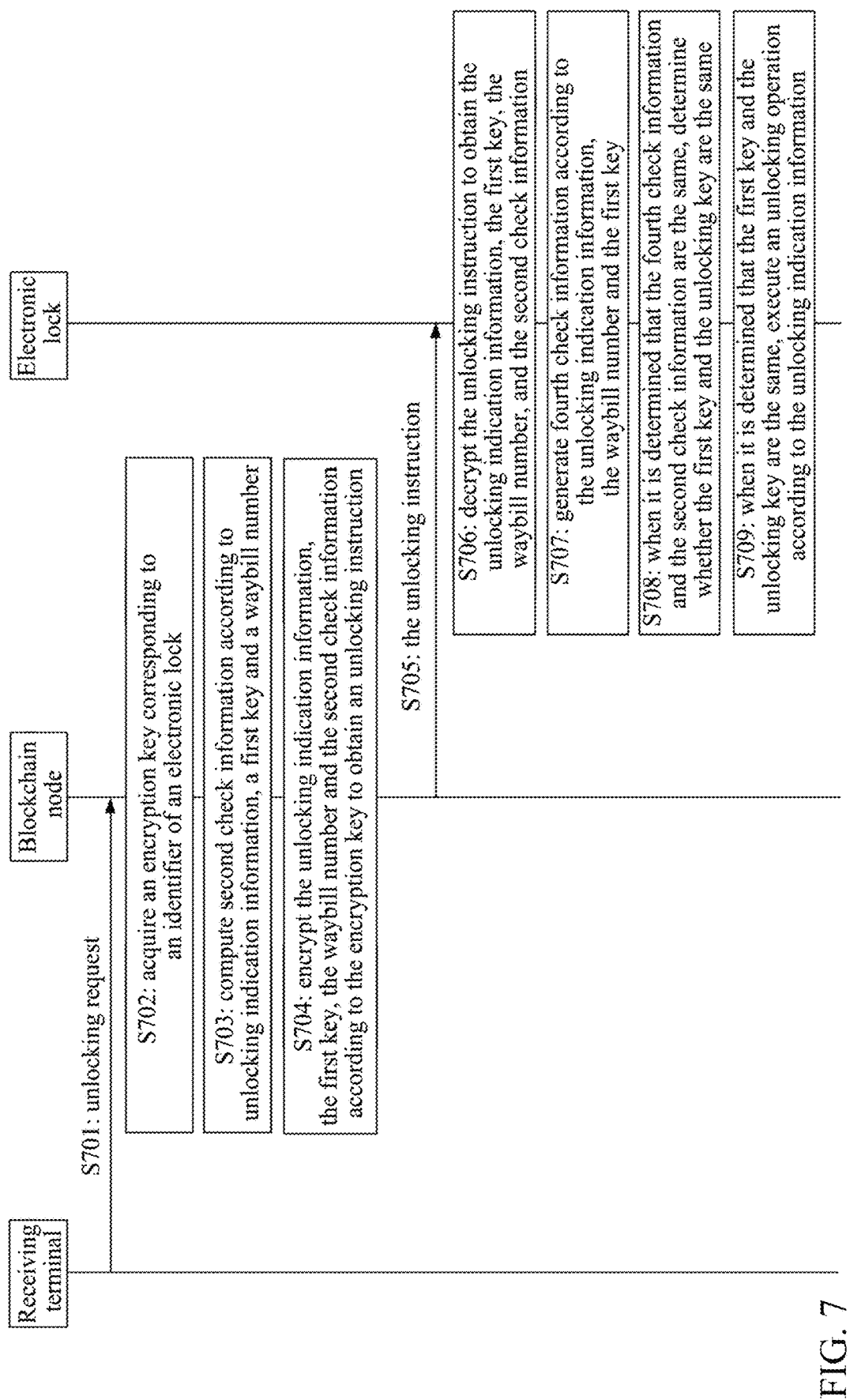
FIG. 7 is a schematic flowchart of another logistics information processing method according to an embodiment of the present disclosure.

FIG. 7 is a schematic flowchart of another logistics information processing method according to an embodiment of the present disclosure. Reference is made to FIG. 7, and the method may include:

S701: a receiving terminal sends an unlocking request to a blockchain node.

The unlocking request includes a waybill number and a first key, where the first key is a key input by a user through the receiving terminal and used for unlocking an electronic lock.

S702: the blockchain node acquires an encryption key corresponding to an identifier of an electronic lock.

Optionally, an identifier of an electronic lock and an encryption key have a preset corresponding relationship, and accordingly, the encryption key may be acquired according to the identifier of the electronic lock and the corresponding relationship.

S703: the blockchain node computes second check information according to unlocking indication information, the first key and the waybill number.

For example, the blockchain node may compute the second check information by using the cyclic redundancy check (CRC) 16 algorithm, or may compute the second check information by using the CRC32 algorithm. Of course, the second check information may also be computed by using other check algorithms, which is not specifically limited in the embodiment of the present disclosure.

S704: the blockchain node encrypts the unlocking indication information, the first key, the waybill number and the second check information according to the encryption key to obtain an unlocking instruction.

S705: the blockchain node sends the unlocking instruction to the electronic lock.

It should be noted that, for the execution process of S705, reference may be made to the execution process of S603, and details are not described herein again.

S706: the electronic lock decrypts the unlocking instruction to obtain the unlocking indication information, the first key, the waybill number, and the second check information.

S707: the electronic lock generates fourth check information according to the unlocking indication information, the waybill number and the first key.

For example, the electronic lock may compute the fourth check information by using the cyclic redundancy check (CRC) 16 algorithm, or may compute the fourth check information by using the CRC32 algorithm. Of course, the fourth check information may also be computed by using other check algorithms, which is not specifically limited in the embodiment of the present disclosure.

S708: when the electronic lock determines that the fourth check information and the second check information are the same, the electronic lock determines whether the first key and the unlocking key are the same.

It should be noted that when the electronic lock determines that the fourth check information and the second check information are different, the electronic lock does not execute the unlocking operation.

S709: when the electronic lock determines that the first key and the unlocking key are the same, the electronic lock executes the unlocking operation according to the unlocking indication information.

Optionally, after the electronic lock executes the unlocking operation, the electronic lock may further send unlocking success information to the blockchain node, where the unlocking success information includes the identifier of the electronic lock and a waybill number. After the blockchain node receives the unlocking success information sent by the electronic lock, the blockchain node adds the unlocking success information to the blockchain, and the unlocking success information includes the identifier of the electronic lock and the order number. The unlocking success information may further include unlocking time, an unlocking location, identity information of a person who unlock the lock, etc.

It should be noted that when the electronic lock determines that the first key and the unlocking key are different, the electronic lock does not execute the unlocking operation. The electronic lock may also send unlocking failure information to the blockchain node.

Optionally, after the electronic lock executes the unlocking operation, the electronic lock may delete the unlocking key and the waybill number stored in the storage space thereof. In this way, after the electronic lock is unlocked, the unlocking key of the electronic lock is invalid, and if the electronic lock is opened by lawbreakers during the logistics, the recipient cannot unlock the electronic lock according to the unlocking key, thus it can be proved that a problem (such as being swapped) occurs in the logistics, and the recipient can refuse to receive the item, thereby further improving the security of logistics for the item.

Optionally, if an item of the logistics is designated to be signed at a preset position, the electronic lock may determine whether a position indicated by GPS information of the electronic lock is the preset position, and if yes, the electronic lock performs the unlocking operation according to the unlocking indication information when the electronic lock determines that the first key and the unlocking key are the same.

Optionally, if an item of the logistics must be signed by a recipient, the electronic lock may further acquire GPS information of the electronic lock and GPS information of the receiving terminal, and when it is determined that the two pieces of GPS information are the same, the electronic lock determines that the first key and the unlocking key are the same, and the electronic lock performs the unlocking operation according to the unlocking indication information.

In the embodiment shown in FIG. 7, since only the recipient and the electronic lock can acquire the unlocking key, only the recipient can open the electronic lock on the logistics box, thereby improving the security of logistics for the item. Further, when the blockchain node sends the unlocking instruction to the electronic lock, the locking instruction is encrypted, which avoids leakage of the unlocking instruction during a transmission, and the electronic lock can also check information in the received unlocking instruction by means of check information, and the unlocking operation is executed only after the check is passed, thereby further improving the security of logistics for the item.

Based on the foregoing embodiment, a process of writing information in an object blockchain will be described below with reference to FIG. 8.

Figure 8:
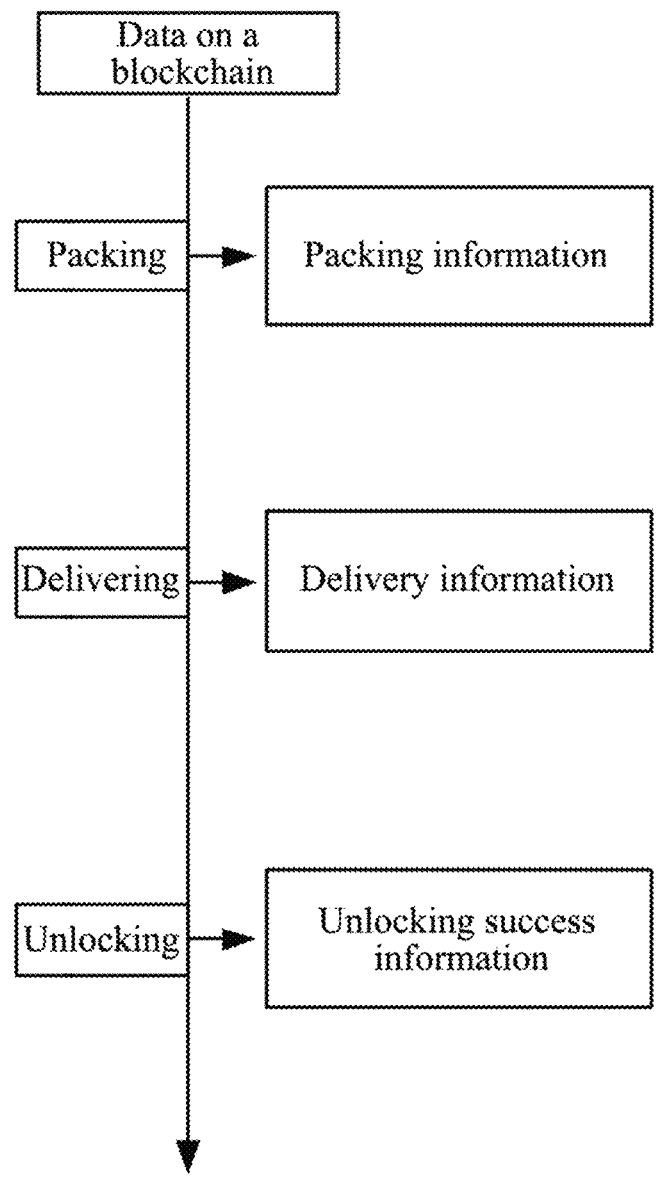
FIG. 8 is a schematic diagram of information on a blockchain according to an embodiment of the present disclosure.

FIG. 8 is a schematic diagram of information on a blockchain according to an embodiment of the present disclosure. Referring to FIG. 8, after packing (loading an item into a logistics box), packing information may be written to a blockchain. When the item is delivered (the item is distributed to a deliverer), the delivery information may be written to the blockchain. After an electronic lock is successfully unlocked, unlocking success information may be written to the blockchain. Of course, other logistics information may also be written into the blockchain, for example, a delivery map may be written into the electronic lock, and if a delivery route deviates from the delivery map, the electronic lock may send alarm information to the blockchain, and the alarm information is written into the blockchain. For example, when an item is in transit, logistics information of the item during the transit (for example, information about a handler, time, a location, etc.) may also be written into the blockchain.

Since a blockchain has a tamper-proof function, by writing the above information into the blockchain, flow of an item can be tracked through the information in the blockchain, so as to prevent the item from being lost, swapped, etc., and improve the security of logistics for the item.

In a practical application process, in order to save costs, an electronic lock may not be provided in a logistics box. During packing, packing personnel may print an electronic sheet, the electronic sheet includes a receiving verification code, and the receiving verification code is covered with an image layer; the packing personnel may adhere the electronic sheet to the logistics box at a position for opening the logistics box, and the packing personnel may send the verification code to a receiving terminal through a handheld terminal. When the logistics box reaches a recipient, the recipient may compare whether the verification code received by the receiving terminal is the same as the verification code on the electronic sheet, and sign when confirming the same. In the above process, if the logistics box is opened during the logistics, the electronic sheet is damaged, and the recipient can refuse the item; and if the logistics box is opened and the electronic sheet is replaced during the logistics, the verification code received by the receiving terminal may be different from the verification code on the electronic sheet, and the recipient may also refuse the item, thus improving the security of logistics for the item.

Optionally, on the basis of any one of the foregoing embodiments, in order to further improve the security of logistics, in a locking process, after the blockchain node acquires an unlocking key, the unlocking key may be encrypted. Accordingly, after the electronic lock receives the encrypted unlocking key, the electronic lock may decrypt the encrypted unlocking key. Optionally, an asymmetric encryption/decryption method may be used to perform encryption/decryption processing on the unlocking key, or a symmetric encryption/decryption method may be used to perform encryption/decryption processing on the unlocking key. For example, when the asymmetric encryption/decryption method is used to perform encryption/decryption processing on the unlocking key, the blockchain node may encrypt the unlocking key by using a public key of the asymmetric key, and the electronic lock may decrypt the unlocking key by using a private key of the asymmetric key. For example, when the symmetric encryption/decryption method is used to perform encryption/decryption processing on the unlocking key, the blockchain node may encrypt the unlocking key with a symmetric key, and the electronic lock may decrypt the unlocking key with a symmetric key.

Optionally, in the locking process, a user may set an unlocking key at a client. Correspondingly, when the client sends the unlocking key to the blockchain node, the client may encrypt the unlocking key, and send the encrypted unlocking key to the blockchain node. After acquiring the encrypted unlocking key, the blockchain node sends the encrypted unlock key to the electronic lock; and the electronic lock may decrypt the encrypted unlocking key. Optionally, an asymmetric encryption/decryption method may be used to perform encryption/decryption processing on the unlocking key, or a symmetric encryption/decryption method may be used to perform encryption/decryption processing on the unlocking key. For example, when the asymmetric encryption/decryption method is used to perform encryption/decryption processing on the unlocking key, the client may encrypt the unlocking key by using a public key of the asymmetric key, and the electronic lock may decrypt the unlocking key by using a private key of the asymmetric key. For example, when the symmetric encryption/decryption method is used to perform encryption/decryption processing on the unlocking key, the client may encrypt the unlocking key with a symmetric key, and the electronic lock may decrypt the unlocking key with a symmetric key.

In a unlocking process, when a receiving terminal sends an unlocking request to a blockchain node, a first key in the unlocking request may be encrypted, and correspondingly, the first key in an unlocking instruction sent by the blockchain node to the electronic lock is also an encrypted key, and after receiving the encrypted first key, the electronic lock decrypts the encrypted first key. Optionally, an asymmetric encryption/decryption method may be used to perform encryption/decryption processing on the first key, or a symmetric encryption/decryption method may be used to perform encryption/decryption processing on the first key. For example, when the asymmetric encryption/decryption method is used to perform encryption/decryption processing on the first key, the receiving terminal may encrypt the first key by using a public key of the asymmetric key, and the electronic lock may decrypt the first key by using a private key of the asymmetric key. For example, when the symmetric encryption/decryption method is used to perform encryption/decryption processing on the first key, the receiving terminal may use a symmetric key to encrypt the first key, and the electronic lock may use a symmetric key to decrypt the first key.

Optionally, in order to improve the security of logistics, encryption/decryption processing may also be performed on a waybill number. It should be noted that, in the locking process, the process of encrypting/decrypting the waybill number is the same as the process of encrypting/decrypting the unlocking key, and in the unlocking process, the process of encrypting/decrypting the waybill number is the same as the process of encrypting/decrypting the first key, which will not be described herein again.

Figure 9:
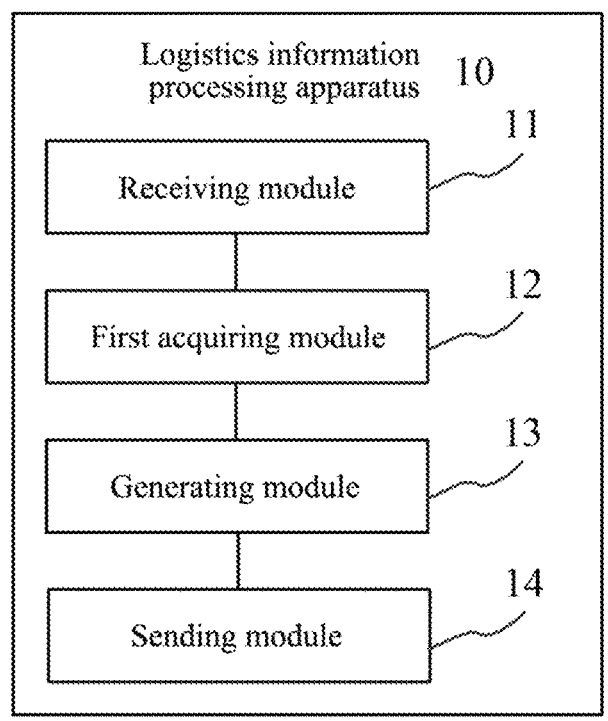
FIG. 9 is a schematic structural diagram of a logistics information processing apparatus according to an embodiment of the present disclosure.

FIG. 9 is a schematic structural diagram of a logistics information processing apparatus according to an embodiment of the present disclosure. The logistics information processing apparatus 10 may be applied to a blockchain node. Referring to FIG. 9, the logistics information processing apparatus 10 may include a receiving module 11, a first acquiring module 12, a generating module 13, and a sending module 14, where:

the receiving module 11 is configured to receive a locking request sent by a handheld terminal, where the locking request is used to request locking of a logistics box, and the locking request includes an identifier of an electronic lock on the logistics box and a waybill number of an item in the logistics box;

the first acquiring module 12 is configured to acquire an unlocking key of the electronic lock corresponding to the waybill number according to the locking request, where the unlocking key is confirmed by a receiving terminal corresponding to the item;

the generating module 13 is configured to generate a locking instruction according to the unlocking key and the waybill number, where the locking instruction is used to instruct the electronic lock to lock, and store the unlocking key and the waybill number; and the sending module 14 is configured to send the locking instruction to the electronic lock.

The logistics information processing apparatus provided in the embodiment of the present disclosure may execute the technical solutions shown in the foregoing method embodiments, and the implementation principle and beneficial effects thereof are similar, which will not be described herein again.

In a possible implementation, the generating module 13 is specifically configured to:
acquire an encryption key corresponding to the identifier of the electronic lock; and
encrypt locking indication information, the unlocking key and the waybill number according to the encryption key to obtain the locking instruction, where the locking indication information is used to instruct to lock the electronic lock.

In a possible implementation, the generating module 13 is specifically configured to:
compute first check information according to the locking indication information, the unlocking key and the waybill number; and
encrypt the locking indication information, the unlocking key, the waybill number, and the first check information according to the encryption key to obtain the locking instruction.

In a possible implementation, the first acquiring module 12 is specifically configured to:
generate the unlocking key according to the locking request; and
send the waybill number and the unlocking key to the receiving terminal.

In a possible implementation, the first acquiring module 12 is specifically configured to:
acquire the unlocking key sent by the receiving terminal according to the locking request, where the unlocking key is input by a recipient through the receiving terminal.

Figure 10:
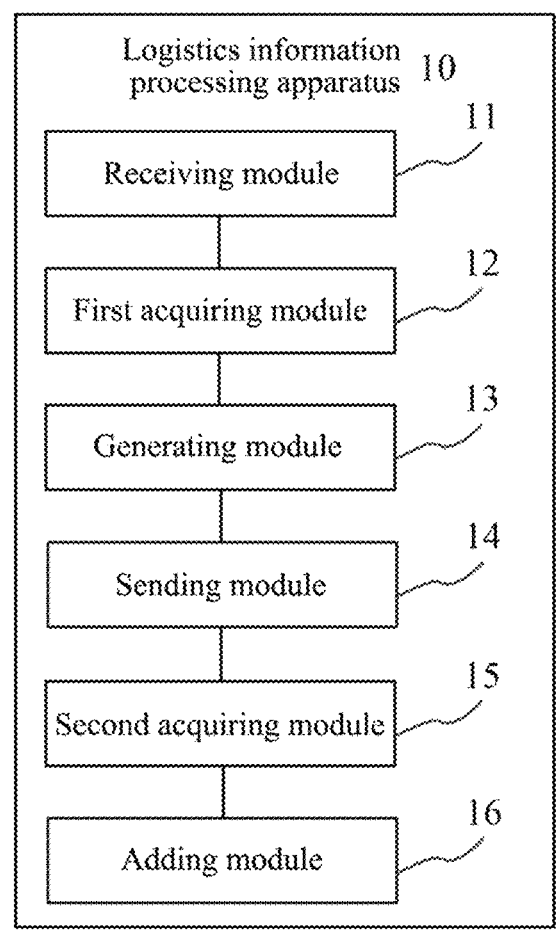
FIG. 10 is a schematic structural diagram of another logistics information processing apparatus according to an embodiment of the present disclosure.

FIG. 10 is a schematic structural diagram of another logistics information processing apparatus according to an embodiment of the present disclosure. On the basis of the embodiment shown in FIG. 9, referring to FIG. 10, the logistics information processing apparatus 10 further includes a second acquiring module 15 and an adding module 16, where:
the second acquiring module 15 is configured to, after the sending module 14 sends the locking instruction to the electronic lock, acquire packing information, where the packing information includes the identifier of the electronic lock, the waybill number, and identity information of a packer; and
the adding module 16 is configured to add the packing information to a blockchain.

In a possible implementation, the receiving module 11 is further configured to receive an unlocking request sent by a receiving terminal, where the unlocking request includes a first key and a waybill list, and the first key is a key input by a user through the receiving terminal and used to unlock an electronic lock corresponding to the waybill number;
the generating module 13 is further configured to generate an unlocking instruction according to the unlocking indication information and the first key; and
the sending module 14 is further configured to send the unlocking instruction to the electronic lock corresponding to the waybill number according to the waybill number.

In a possible implementation, the generating module 13 is specifically configured to:
acquire an encryption key corresponding to the electronic lock; and
encrypt the unlocking indication information, the first key and the waybill number according to the encryption key to obtain the unlocking instruction, where the unlocking indication information is used to instruct to unlock the electronic lock.

In a possible implementation, the generating module 13 is specifically configured to: compute second check information according to the unlocking indication information, the first key, and the waybill number; and
encrypt the unlocking indication information, the first key, the waybill number and the second check information according to the encryption key to obtain the unlocking instruction.

In a possible implementation, the receiving module 11 is further configured to, after the sending module sends the unlocking instruction to the electronic lock, receive unlocking success information sent by the electronic lock, where the unlocking success information includes the identifier of the electronic lock and the waybill number; and
the adding module is further configured to add the unlocking success information to a blockchain.

The logistics information processing apparatus provided in the embodiments of the present disclosure may execute the technical solutions shown in the foregoing method embodiments, and the implementation principle and beneficial effects thereof are similar, which will not be described herein again.

Figure 11:
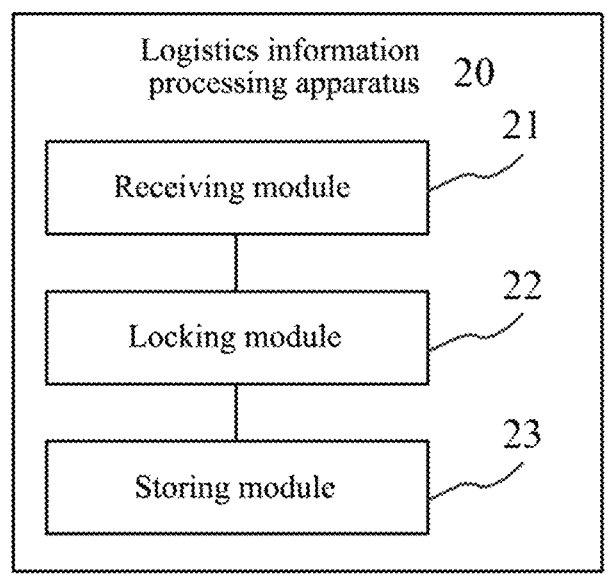
FIG. 11 is a schematic structural diagram of yet another logistics information processing apparatus according to an embodiment of the present disclosure.

FIG. 11 is a schematic structural diagram of yet another logistics information processing apparatus according to an embodiment of the present disclosure. The logistics information processing apparatus 20 may be applied to an electronic lock. Referring to FIG. 11, the logistics information processing apparatus 20 may include a receiving module 21, a locking module 22, and a storing module 23, where:
the receiving module 21 is configured to receive a locking instruction sent by a blockchain node, where the locking instruction includes locking indication information, an unlocking key, and a waybill number;
the locking module 22 is configured to execute a locking operation according to the locking indication information; and
the storing module 23 is configured to store the unlocking key and the waybill number.

The logistics information processing apparatus provided in the embodiment of the present disclosure may execute the technical solutions shown in the foregoing method embodiments, and the implementation principle and beneficial effects thereof are similar, which will not be described herein again.

In a possible implementation, the locking instruction further includes first check information; and the locking module 22 is specifically configured to:
generate third check information according to the waybill number, the locking indication information and the unlocking key; and
execute, by the electronic lock, the locking operation according to the locking indication information when it is determined that the first check information and the third check information are the same.

Figure 12:
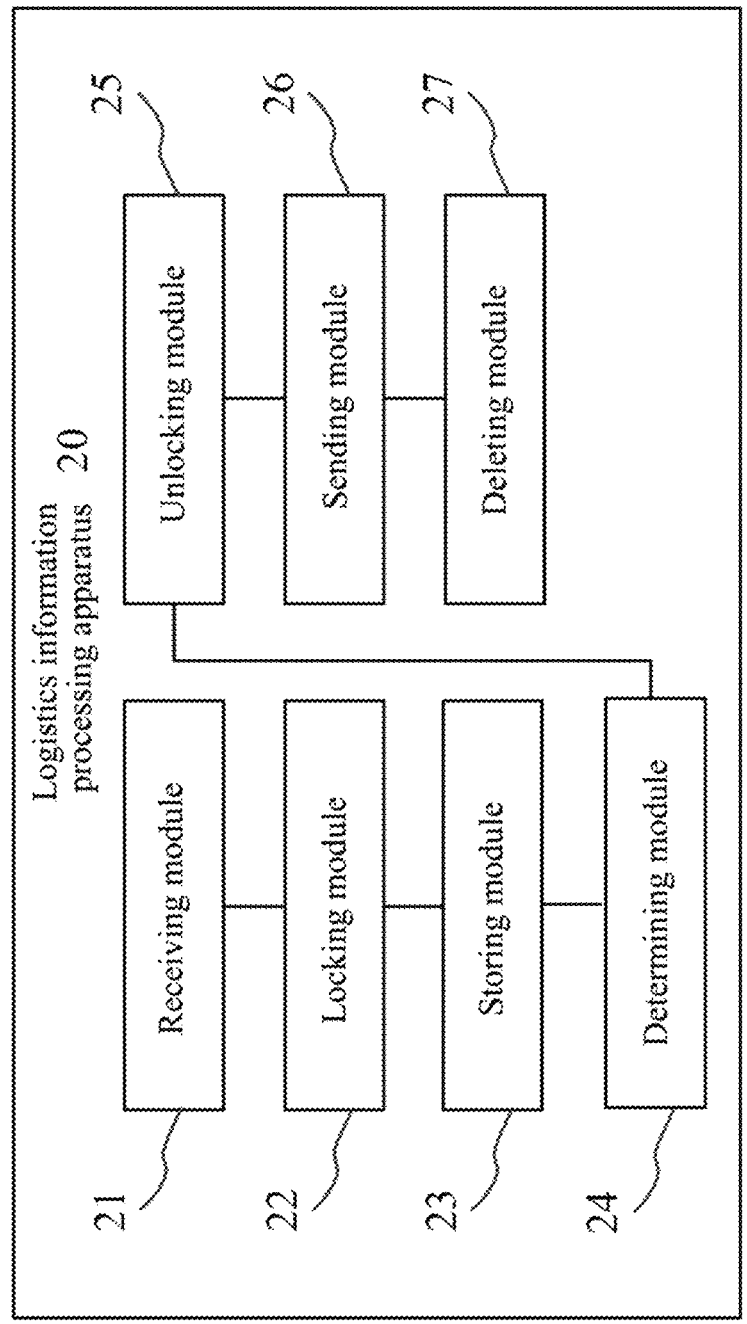
FIG. 12 is a schematic structural diagram of still another logistics information processing apparatus according to an embodiment of the present disclosure.

FIG. 12 is a schematic structural diagram of still another logistics information processing apparatus according to an embodiment of the present disclosure. On the basis of the embodiment shown in FIG. 11, referring to FIG. 12, the logistics information processing apparatus 20 may further include a determining module 24 and an unlocking module 25, where:

the receiving module 21 is further configured to receive an unlocking instruction sent by the blockchain node, where the unlocking instruction includes unlocking indication information and a first key;

the determining module 24 is configured to determine whether the first key is the same as the unlocking key; and the unlocking module 25 is configured to execute an unlocking operation according to the unlocking indication information when the determining module 24 determines that the first key and the unlocking key are the same.

In a possible implementation, the unlocking instruction further includes the waybill number and second check information, and the determining module 24 is specifically configured to:

generate fourth check information according to the unlocking indication information, the waybill number and the first key; and determine whether the first key and the unlocking key are the same when it is determined that the fourth check information and the second check information are the same.

In a possible implementation, the logistics information processing apparatus 20 further includes a sending module 26, where the sending module 26 is further configured to, after the unlocking module 25 executes the unlocking operation according to the unlocking indication information, send unlocking success information to the blockchain node, where the unlocking success information includes the identifier of the electronic lock and the waybill number.

In a possible implementation, the logistics information processing apparatus 20 further includes a deleting module 27, where the deleting module 27 is configured to delete the stored unlocking key and the waybill number after the unlocking module 25 executes the unlocking operation according to the unlocking indication information.

The logistics information processing apparatus provided in the embodiments of the present disclosure may execute the technical solutions shown in the foregoing method embodiments, and the implementation principle and beneficial effects thereof are similar, which will not be described herein again.

Figure 13:
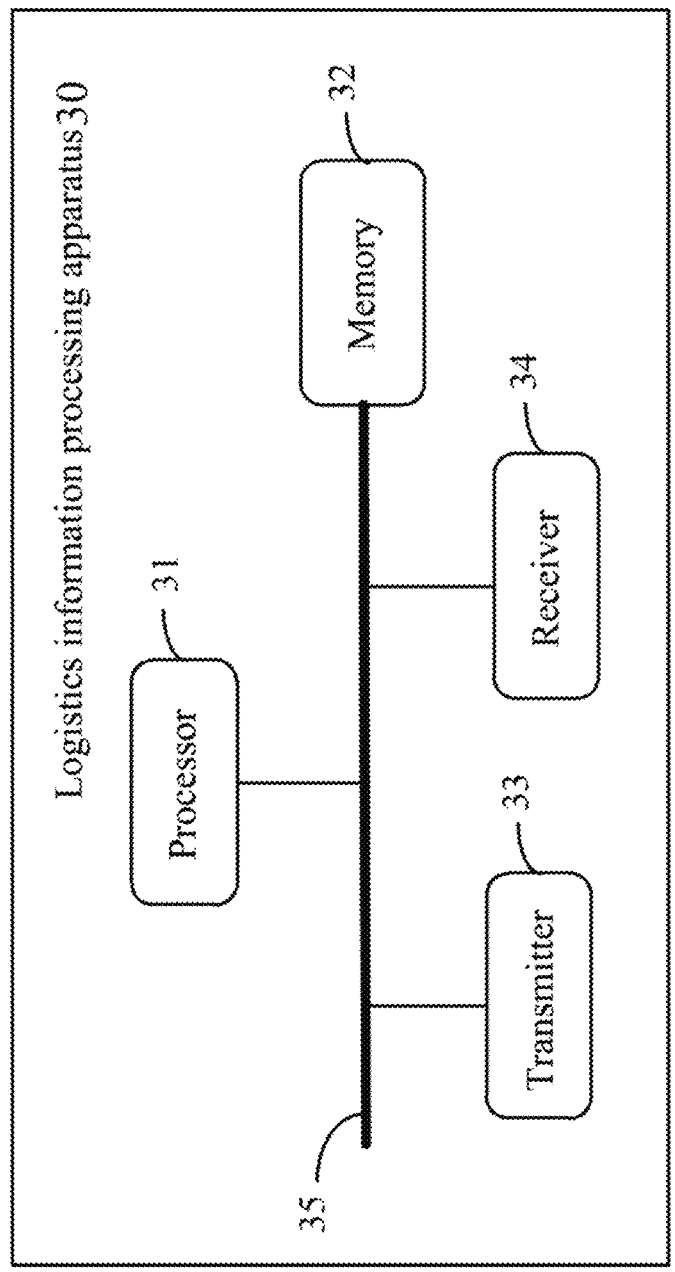
FIG. 13 is a schematic diagram of a hardware structure of a logistics information processing apparatus according to an embodiment of the present disclosure.

FIG. 13 is a schematic diagram of a hardware structure of a logistics information processing apparatus according to an embodiment of the present disclosure. As shown in FIG. 13, the logistics information processing apparatus 30 includes at least one processor 31, a memory 32, a transmitter 33, and a receiver 34. The processor 31, the memory 32, the transmitter 33 and the receiver 34 are connected via a bus 35.

In a specific implementation, the at least one processor 31 executes computer execution instructions stored in the memory 32, causing the at least one processor 31 to execute the logistics information processing method as described above.

For a specific implementation of the processor 31, reference may be made to the foregoing method embodiments, and the implementation principle and technical effects thereof are similar, and details are not described herein.

Figure 14:
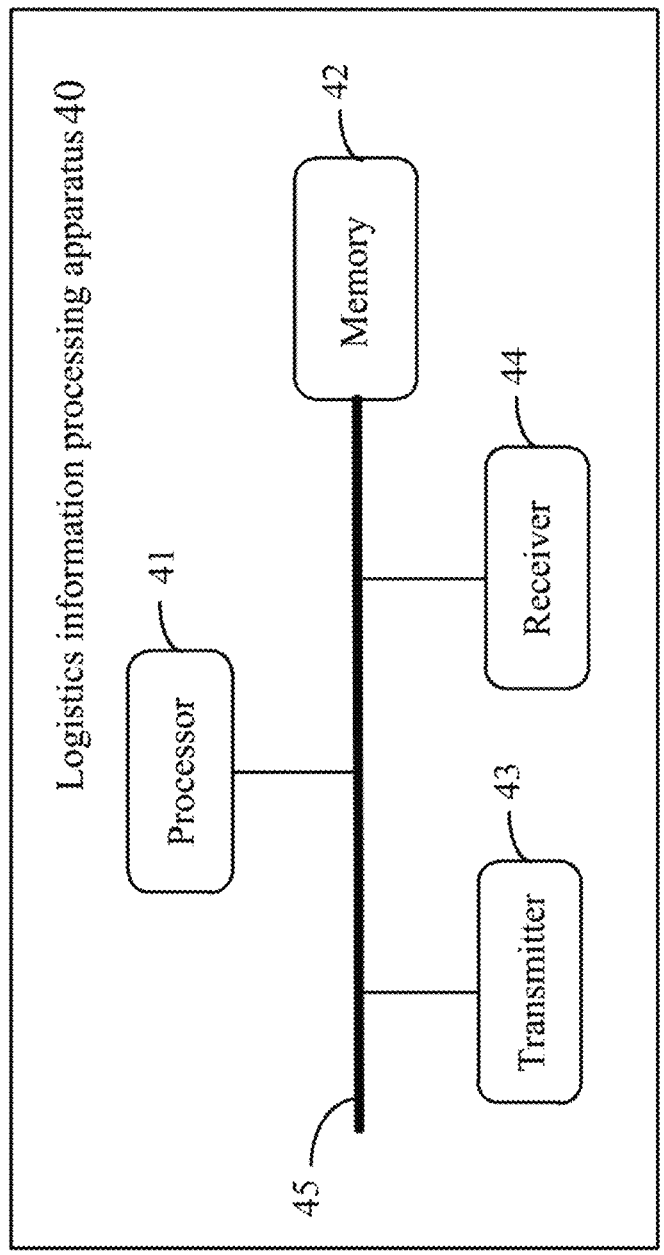
FIG. 14 is a schematic diagram of a hardware structure of a logistics information processing apparatus according to an embodiment of the present disclosure.

FIG. 14 is a schematic diagram of a hardware structure of a logistics information processing apparatus according to an embodiment of the present disclosure. As shown in FIG. 14, the logistics information processing apparatus 40 includes at least one processor 41, a memory 42, a transmitter 43, and a receiver 44. The processor 41, the memory 42, the transmitter 43 and the receiver 44 are connected via a bus 45.

In a specific implementation, the at least one processor 41 executes computer execution instructions stored in the memory 42, causing the at least one processor 41 to execute the logistics information processing method as described above.

For a specific implementation of the processor 41, reference may be made to the foregoing method embodiments, and the implementation principle and technical effects thereof are similar, and details are not described herein.

In the embodiments shown in FIG. 13 and FIG. 14, it should be understood that the processor may be a central processing unit (Central Processing Unit, CPU), and may also be other general processors, a digital signal processor (Digital Signal Processor, DSP), an application specific integrated circuit (Application Specific Integrated Circuit, ASIC), etc. A general processor may be a microprocessor or the processor may also be any conventional processor or the like. Steps of the method disclosed in connection with in the present disclosure may be directly embodied as being executed by a hardware processor, or by a combination of hardware and software modules in the processor.

The memory may include a high-speed RAM memory, and may also include a non-volatile storage NVM, such as at least one disk memory.

The bus may be an Industry Standard Architecture (ISA) bus, a Peripheral Component Interconnect (PCI) bus, an Extended Industry Standard Architecture (EISA) bus, or the like. The bus may be divided into an address bus, a data bus, a control bus, etc. For ease of illustration, the bus in the drawings of the present application does not define only one bus or one type of bus.

The present application further provides a computer readable storage medium, in which a computer execution instruction is stored, and when a processor executes the computer execution instruction, the logistics information processing method as described above is implemented.

The computer readable storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk. The readable storage medium may be any available medium that is accessible to a general computer or a special computer.

An illustrative readable storage medium is coupled to the processor to enable the processor to read information from the readable storage medium and to write information to the readable storage medium. Of course, the readable storage medium may also be an integral part of the processor. The processor and the readable storage medium may be located in an Application Specific Integrated Circuit (ASIC). Of course, the processor and the readable storage medium may also be present in a device as discrete components.

An embodiment of the present application provides a computer program product, where the computer program product includes an instruction, and when the instruction is executed, a computer is caused to execute the above logistics information processing method.

The division of units is merely a logical function division, and in a practical implementation, there may be other division manners, for example, a plurality of units or components may be combined or integrated into another system, or some features may be ignored or not performed. In another point, the displayed or discussed coupling or direct coupling or communication connection to each other may be indirect coupling or communication connection through some interfaces, apparatuses or units, and may be electrical, mechanical or in other forms.

The units described as separate components may or may not be physically separate, and the components displayed as units may or may not be physical units, that is, may be located in one place, or may be distributed to a plurality of network units. Some or all of the units may be selected according to actual needs to achieve the purpose of the solution of the present embodiment.

In addition, each functional unit in each embodiment of the present disclosure may be integrated in one processing unit, or each unit may be separately physically present, or two or more units may be integrated in one unit.

The function may be stored in a computer readable storage medium if it is implemented in a form of a software function unit and sold or used as an independent product. Based on such understanding, the technical solution of the present disclosure in essence, or a part that makes a contribution to the related art, or a part of the technical solution can be embodied in a form of a software product. The computer software product is stored in a storage medium, including several instructions for enabling a computer device (which may be a personal computer, a server, or a network device, etc.) to perform all or part of the steps of the method described in each embodiment of the present disclosure. The foregoing storage medium includes: a U disk, a mobile hard disk, a read-only memory (ROM), a random access memory (RAM), a magnetic disk, or an optical disk, and any other medium that can store program codes.

Persons of ordinary skill in the art can understand that all or part of the steps of the foregoing method embodiments may be implemented by a program instructing relevant hardware. The foregoing program may be stored in a computer readable storage medium. When the program is executed, the steps which are included in the foregoing method embodiments are executed. The storage medium includes any medium that can store program codes, such as a ROM, a RAM, a magnetic disk, or an optical disk.

Finally, it should be noted that the above embodiments are merely used for illustrating the technical solutions of the present disclosure, and are not limited thereto. Although the present disclosure has been described in detail with reference to the foregoing embodiments, it should be understood by those skilled in the art that the technical solutions described in the foregoing embodiments can be modified or equivalent replacements can be made to some or all of the technical features. These modifications or replacements do not depart from the scope of the technical solutions of the embodiments of the present disclosure.

What is claimed is:

1. A logistics information processing method, comprising:
    receiving, by a blockchain node, a locking request sent by a handheld terminal, wherein the locking request is used to request locking of a logistics box, and the locking request comprises an identifier of an electronic lock on the logistics box and a waybill number of an item in the logistics box;
    acquiring, by the blockchain node, an unlocking key of the electronic lock corresponding to the waybill number according to the locking request, wherein the unlocking key is confirmed by a receiving terminal corresponding to the item; and
    generating, by the blockchain node, a locking instruction according to the unlocking key and the waybill number, and sending the locking instruction to the electronic lock, wherein the locking instruction is used to instruct the electronic lock to lock, and store the unlocking key and the waybill number,
    wherein the acquiring, by the blockchain node, the unlocking key of the electronic lock corresponding to the waybill number according to the locking request comprises:
    acquiring, by the blockchain node, the unlocking key sent by the receiving terminal according to the locking request, wherein the unlocking key is input by a recipient through the receiving terminal.

2. The method according to claim 1, wherein generating, by the blockchain node, the locking instruction according to the unlocking key and the waybill number comprises:
    acquiring, by the blockchain node, an encryption key corresponding to the identifier of the electronic lock; and
    encrypting, by the blockchain node, locking indication information, the unlocking key and the waybill number according to the encryption key to obtain the locking instruction, wherein the locking indication information is used to instruct to lock the electronic lock.

3. The method according to claim 2, wherein encrypting, by the blockchain node, locking indication information, the unlocking key and the waybill number according to the encryption key to obtain the locking instruction comprises:
    computing, by the blockchain node, first check information according to the locking indication information, the unlocking key, and the waybill number; and
    encrypting, by the blockchain node, the locking indication information, the unlocking key, the waybill number and the first check information according to the encryption key to obtain the locking instruction.

4. The method according to claim 1, wherein after the blockchain node sends the locking instruction to the electronic lock, the method further comprises:
    acquiring, by the blockchain node, packing information, wherein the packing information comprises the identifier of the electronic lock, the waybill number, and identity information of a packer; and
    adding, by the blockchain node, the packing information to a blockchain.

5. The method according to claim 1, wherein the method further comprises:
    receiving, by the blockchain node, an unlocking request sent by a receiving terminal, wherein the unlocking request comprises a first key and a waybill number, and the first key is a key input by a user through the receiving terminal and used to unlock an electronic lock corresponding to the waybill number;
    generating, by the blockchain node, an unlocking instruction according to unlocking indication information and the first key; and
    sending, by the blockchain node, the unlocking instruction to the electronic lock corresponding to the waybill number according to the waybill number.

6. The method according to claim 5, wherein generating, by the blockchain node, the unlocking instruction according to the unlocking indication information and the first key comprises:
    acquiring, by the blockchain node, an encryption key corresponding to the electronic lock; and
    encrypting, by the blockchain node, the unlocking indication information, the first key and the waybill number according to the encryption key to obtain the unlocking instruction, wherein the unlocking indication information is used to instruct to unlock the electronic lock.

7. The method according to claim 6, wherein encrypting, by the blockchain node, the unlocking indication information, the first key and the waybill number according to the encryption key to obtain the unlocking instruction comprises:
computing, by the blockchain node, second check information according to the unlocking indication information, the first key, and the waybill number; and
encrypting, by the blockchain node, the unlocking indication information, the first key, the waybill number and the second check information according to the encryption key to obtain the unlocking instruction.

8. The method according to claim 5, wherein after the blockchain node sends the unlocking instruction to the electronic lock, the method further comprises:
receiving, by the blockchain node, unlocking success information sent by the electronic lock, wherein the unlocking success information comprises the identifier of the electronic lock and a waybill number; and
adding, by the blockchain node, the unlocking success information to a blockchain.

9. A logistics information processing method, comprising:
receiving, by an electronic lock, a locking instruction sent by a blockchain node, wherein the locking instruction comprises locking indication information, an unlocking key and a waybill number;
executing, by the electronic lock, a locking operation according to the locking indication information; and
storing, by the electronic lock, the unlocking key and the waybill number,
wherein the unlocking key sent by a receiving terminal is acquired by the blockchain node according to a locking request, and the unlocking key is input by a recipient through the receiving terminal.

10. The method according to claim 9, wherein the locking instruction further comprises first check information; executing, by the electronic lock, the locking operation according to the locking indication information comprises:
generating, by the electronic lock, third check information according to the waybill number, the locking indication information and the unlocking key; and
when the electronic lock determines that the first check information and the third check information are the same, executing, by the electronic lock, the locking operation according to the locking indication information.

11. The method according to claim 9, wherein the method further comprises:
receiving, by the electronic lock, an unlocking instruction sent by the blockchain node, wherein the unlocking instruction comprises unlocking indication information and a first key;
determining, by the electronic lock, whether the first key is the same as the unlocking key; and
if yes, executing, by the electronic lock, an unlocking operation according to the unlocking indication information.

12. The method according to claim 11, wherein the unlocking instruction further comprises the waybill number and second check information, and determining, by the electronic lock, whether the first key is the same as the unlocking key comprises:

generating, by the electronic lock, fourth check information according to the unlocking indication information, the waybill number and the first key; and
when the electronic lock determines that the fourth check information and the second check information are the same, determining, by the electronic lock, whether the first key and the unlocking key are the same.

13. The method according to claim 11, wherein after the electronic lock executes the unlocking operation according to the unlocking indication information, the method further comprises:
sending, by the electronic lock, unlocking success information to the blockchain node, wherein the unlocking success information comprises an identifier of the electronic lock and a waybill number.

14. The method according to claim 11, wherein after the electronic lock executes the unlocking operation according to the unlocking indication information, the method further comprises:
deleting, by the electronic lock, the stored unlocking key and the waybill number.

15. A logistics information processing apparatus, applied to a blockchain node, the apparatus comprising a memory, configured to store a program; and
a processor, configured to execute the program stored in the memory, and when the program is executed, the processor is configured to:
receive a locking request sent by a handheld terminal, wherein the locking request is used to request locking of a logistics box, and the locking request comprises an identifier of an electronic lock on the logistics box and a waybill number of an item in the logistics box;
acquire an unlocking key of the electronic lock corresponding to the waybill number according to the locking request, wherein the unlocking key is confirmed by a receiving terminal corresponding to the item;
generate a locking instruction according to the unlocking key and the waybill number, wherein the locking instruction is used to instruct the electronic lock to lock, and store the unlocking key and the waybill number; and
send the locking instruction to the electronic lock,
wherein the processor is specifically configured to:
acquire the unlocking key sent by the receiving terminal according to the locking request, wherein the unlocking key is input by a recipient through the receiving terminal.

16. A logistics information processing apparatus, applied to an electronic lock, the apparatus comprising a memory, configured to store a program; and
a processor, configured to execute the program stored in the memory, and when the program is executed, the processor is configured to execute the method according to claim 9.

17. A non-transitory computer readable storage medium, wherein the computer readable storage medium stores computer execution instructions, and when a processor executes the computer execution instructions, the logistics information processing method according to claim 1 is implemented.

18. A non-transitory computer readable storage medium, wherein the computer readable storage medium stores computer execution instructions, and when a processor executes the computer execution instructions, the logistics information processing method according to claim 9 is implemented.

* * * * *